Feb. 20, 1962 T. O. KOSATKA 3,022,080
SELF-CONTAINED SEALING DEVICE
Filed Sept. 8, 1958 2 Sheets-Sheet 1
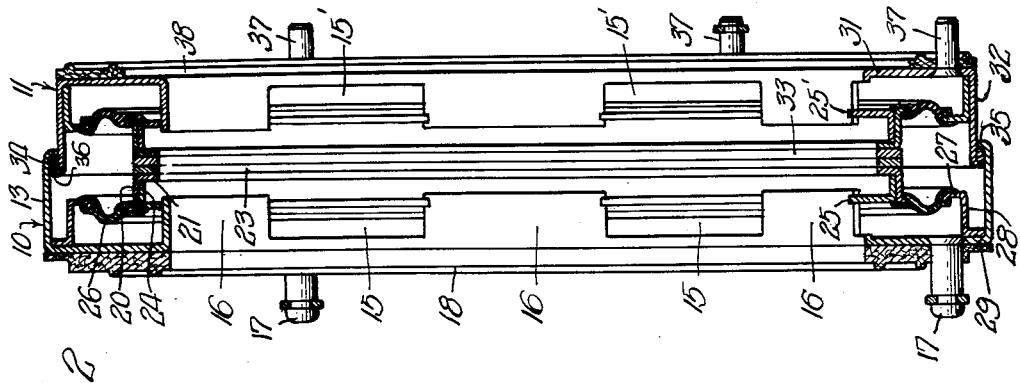
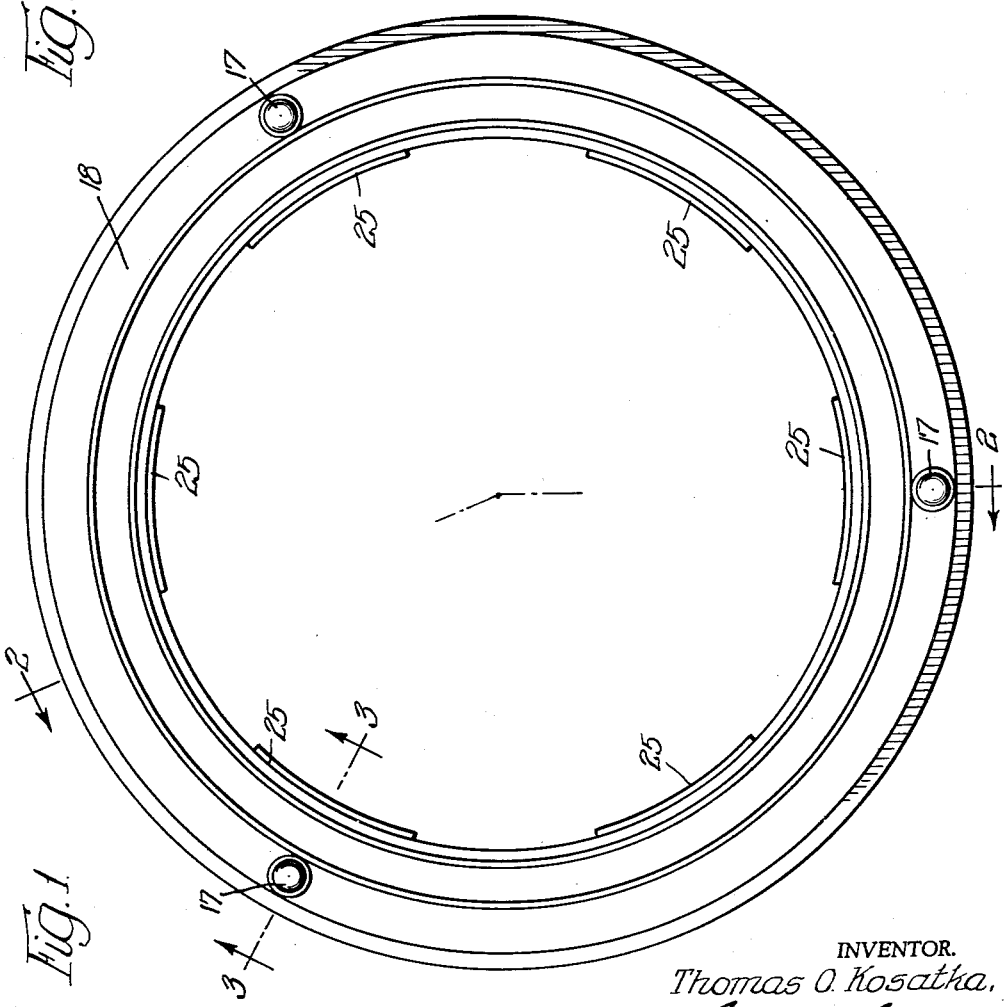
INVENTOR.
Thomas O. Kosatka,
BY George H. Simmons
ATTY.

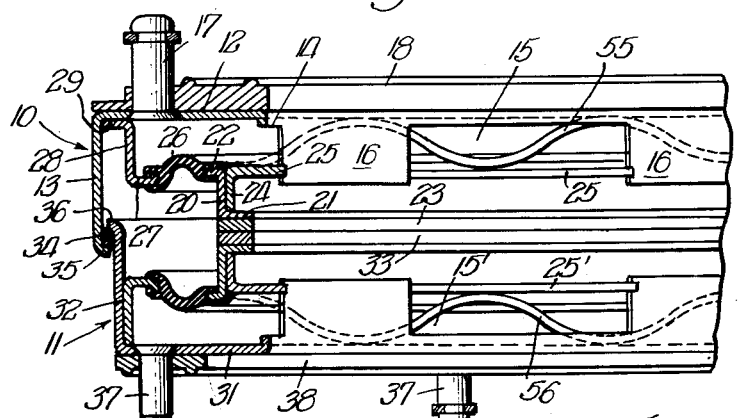
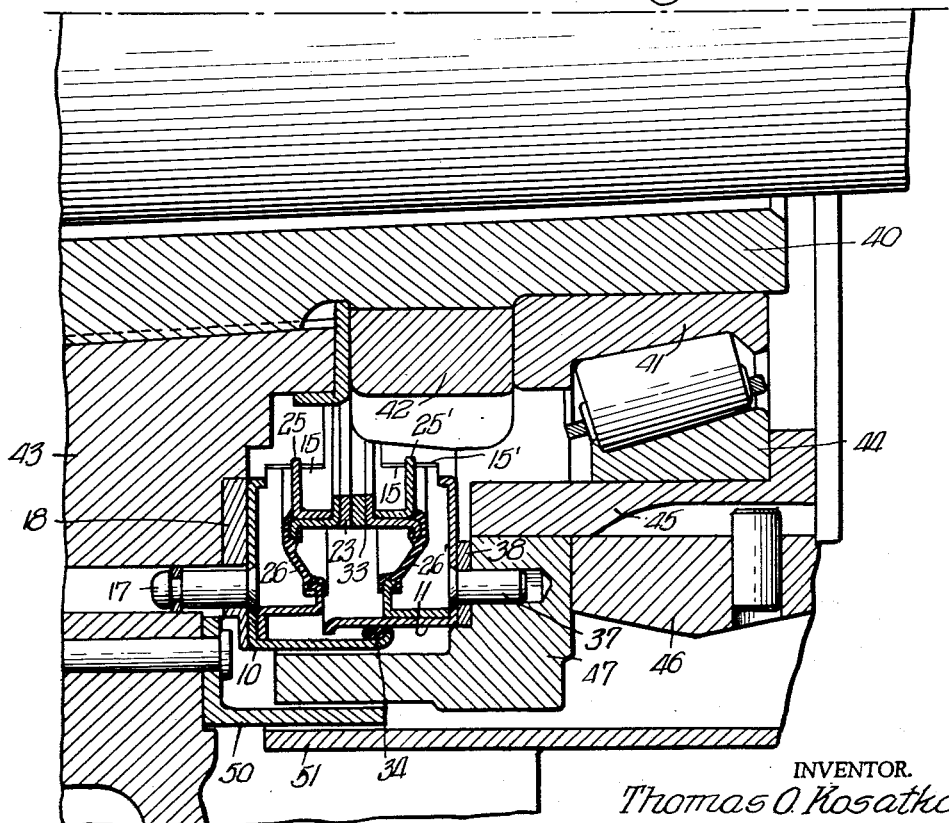

United States Patent Office 3,022,080
Patented Feb. 20, 1962

3,022,080
SELF-CONTAINED SEALING DEVICE
Thomas O. Kosatka, Chicago, Ill., assignor to Victor Manufacturing & Gasket Company, Chicago, Ill., a corporation of Illinois
Filed Sept. 8, 1958, Ser. No. 759,578
3 Claims. (Cl. 277—36)

This invention relates to heavy duty face type sealing devices and has for its principal object the provision of a new and improved device of this type.

It is a main object of the invention to provide a heavy duty face type sealing device that is a unitary structure containing mating sealing faces within the device, forming therein an inner seal for preventing the loss of lubricant from cavities within a pair of relatively rotatable machine parts.

Another object of the invention is to provide a self-contained sealing device having an inner seal for controlling the flow of lubricant and an outer seal for preventing extraneous matter from engaging that inner seal.

Another object of the invention is to provide a self-contained sealing device consisting of two units each having an outer portion adapted for mounting upon a machine part and each having an inner portion adapted to form an inner seal.

Another object of the invention is to provide a sealing device in which an inner seal is formed by the engagement together of seal rings and in which elastomer annuli are stressed in tension to maintain the seal rings engaged under pressure.

Another object of the invention is to provide a self-contained sealing device which is sufficiently rugged to withstand the hard usage encountered in heavy duty installations, a device which can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which:

FIG. 1 is a plan view of a sealing device embodying the teachings of the invention;

FIG. 2 is a cross sectional view of the device taken along the line 2—2 of FIG. 1, looking in the direction of the arrows;

FIG. 3 is a fragmentary cross sectional view along the line 3—3 of FIG. 1, drawn to an enlarged scale and showing a modified form of the invention; and FIG. 4 is a cross sectional view showing the device in operating position in a typical installation.

Heavy duty face type seals are commonly employed to form a seal between the main drive shaft and gear box of a track-laying tractor. Heretofore such seals have consisted of a unit having a base portion fixed upon one of the relatively rotatable members and containing a seal ring on an inner section of the base portion, which seal ring bears against a mating plate carried upon the other member. An elastomer bellows has been interposed between the seal ring and base portion thereby to control the flow of lubricant out of the gear box and to prevent the entry of extraneous matter into the gear box.

In the prior art seals of this kind, of which I am aware, the seal ring has been at the outermost portion of the sealing device, and notwithstanding that suitable shields have been provided to prevent the entry of extraneous materials into contact with the seal rings, nevertheless such material has worked its way into such contact.

Tractors of this kind are commonly employed in construction work and as a result mud or dust, oftentimes quite abrasive, are encountered. These materials coming into contact with the sealing ring and mating surface frequently wear away these members, with the result that replacement of the seal ring and/or mating member is frequently necessary.

In the prior art devices of which I am aware, the seal rings have frequently been composed of cork or a fabric impregnated with an elastomeric material, and as a result considerable pressure has been necessary to form a seal between the seal ring and its mating plate, this pressure being usually applied by a plurality of coil springs disposed within the sealing device and bearing against the portion thereof upon which the seal ring is fixed.

The sealing device of the present invention is adapted to heavy duty service and introduces a new innovation in such devices. The device of the present invention is a self-contained sealing device consisting of two units each having an outer portion adapted to be fixed in seal forming engagement with one of the machine parts and having an inner member movable axially with respect to the outer member and carrying a seal ring. The two outer members are telescoped together, bringing the seal rings of the two units together in seal forming engagement. Each unit is provided with an elastomer annulus extending between its inner and outer members, forming a seal therebetween, which annuli are stretched when the sealing device is in operating position thereby to maintain the seal rings engaged together under pressure. An outer seal is provided between the telescoped together outer portions of the units, this seal serving to prevent entry of extraneous matter, such as mud or dust, into engagement with the seal rings. Through this arrangement the inner seal formed by the seal rings is called upon only to prevent escape of lubricant from within the machine parts, and the entry of extraneous material into cavities in these parts is prevented by seals between the outer members of the units and machine parts upon which they are fixed, and between telescoped outer members.

The invention will be best understood by reference to the drawings, particularly FIGS. 2 and 3, wherein it will be seen that the sealing device consists of two units indicated generally at 10 and 11. The unit 10 consists of an outer member having a metallic annulus 12, from the outer edge of which a cylindrical flange 13 projects. A shorter cylindrical flange 14 projects from the inner edge of the annulus 12, this flange terminating in a slotted portion having slots 15 uniformly spaced between tongue-like portions 16. Preferably the slot portions 15 equal about one-half of the circumferential length of the flange 14 and the tonguelike portions 16 make up the other one-half.

The annulus 12 carries pins 17 and a sealing washer by which the unit is mounted upon a machine part in seal forming engagement therewith. The unit 10 is provided with an inner member having a cylindrical portion 20, from one end of which a flange 21 projects radially inwardly, and from the other end of which a flange 22 projects radially outwardly. A seal ring 23 is fixed upon the flange 21. A reinforcing ring having a cylindrical portion 24 that engages the portion 20, is fixed thereto, this reinforcing ring having an inwardly extending flange that terminates in tongues 25 that project into the slots 15 to prevent rotation of the inner member with respect to the outer member of the unit.

An elastomer annulus 26 is bonded at its inner edge to the outwardly projecting flange 22 of the inner member and bonded at its outer edge to the inwardly extending flange 27 of a mounting ring 28, which mounting ring has at its outer end an outwardly extending flange 29 that abuts against the annulus 12 and the outer wall 13 of the unit and is fixed thereto.

The unit 11 is of the same construction, except that the annulus 31 thereof is somewhat narrower radially than the annulus 12, with the result that the outer cylindrical flange 32 of the unit 11 telescopes into the flange 13 of the unit 10. The inner walls of the two units are aligned with each other, and the inner member of the unit 11 is identical with the inner member of the unit 10. When the two units are telescoped together in the manner shown in FIGS. 2 and 3, the seal ring 33 of the unit 11 engages the seal ring 23 of the unit 10. An outer seal, which in the embodiment shown consists of an elastomer O ring 34, engages the inner surface of the flange 13 and the outer surface of the flange 32 to form a seal therebetween. It will be noted that the edge of the flange 13 is turned in, forming a rim 35, and the edge of the flange 32 turned out, forming a rim 36. These rims engaging the O ring 34 serve to hold the two units together as a unitary device.

It will be noted that the pins 37 carried by the annulus 31 of the unit 11, are of different dimension and spaced differently than are the pins 17 on the unit 10. This particular arrangement enables the sealing device to be fitted into operating position in an existing machine.

In FIG. 4, I have shown a typical installation wherein one machine part consists of a sleeve 40 engaged with the inner race 41 of a roller bearing, and a spacing ring 42 and a hub 43. The hub is recessed and the unit 10 of the device fitted in this recess, with the pin 17 projecting into holes opening into the recess. The sealing washer 18 forms a fluid tight seal between the unit 10 and the machine part.

The other machine part in the embodiment shown consists of the outer race 44 of the roller bearing, and collars 45, 46 and 47, collars 45 and 47 together forming a recess into which the unit 11 is fitted, with the pins 37 thereof projecting into openings in the collar 47. The sealing washer 38 of the unit 11 forms a seal therebetween.

It will be noted that with the seal so installed, the tongues 25 on the unit 10 are disposed at the approximate mid-points of the grooves 15 in the outer member of that unit, and the tongues 25' of the unit 11 are similarly positioned in the slots 15' of that member. Also be it noted that the movement of the inner members of the units 10 and 11 inwardly of the outer members thereof, stretches elastomer annulus 26 of the member 10 and the elastomer annulus 26' of the member 11. Through this arrangement the seal rings 23 and 33 are maintained in engagement under pressure.

In accordance with the teachings of the present invention, the seal rings 23 and 33 are preferably composed of metal, such as steel or bronze, and the engaging faces of these rings are polished to a high degree of flatness, with the result that the pressures necessary to maintain the seal rings in seal forming engagement with each other is considerably less than in sealing devices wherein the seal rings are composed of a compressible material such as cork. By making the elastomer annuli 26 and 26' of suitable thickness, the stretching thereof, as the device moves into operating position, is sufficient to build up sufficient tension therein to apply the required pressure to the seal rings 23 and 33 and no springs are needed. When composed of metal, the seal rings may be fixed upon the flanges upon which they are mounted by welding, such as by Bundy welds.

While it is preferable that the seal rings 23 and 33 be composed of metal, it is also contemplated that in certain instances these rings may be composed of a thermosetting plastic, such as Bakelite, or of other materials having a low coefficient of friction such as Teflon, nylon, or even an elastomer, such as Buna N or neoprene, composed so as to have great hardness and little or no compressibility. When composed of such materials, the seal rings are cemented or bonded to the flanges upon which they are mounted.

In the application of the invention shown by way of example, the relatively moving machine parts are equipped with shields 50 and 51, which prevent the entry of large particles of extraneous material into engagement with the sealing device but do not preclude the entry of fine mud or dust into such engagement. Such extraneous materials as do get past the shields 50 and 51 are prevented from entry into the grease chamber surrounding the roller bearing by the seals 18 and 38 and by the outer seal 34 of the sealing device. Through this arrangement the seal rings 23 and 33 are guarded against deterioration occasioned by abrasive material and serve only to prevent the loss of lubricant from between the machine parts.

Normally the relatively rotatable machine parts of a tractor of this kind have little or no axial movement and the sealing device is capable of maintaining seal between these parts for a long period of time without deterioration. In other instances, where the axial movement between the machine parts is relatively greater, it may be advantageous to augment the pressure placed on the sealing rings by the stretching of the elastomer annuli, and in FIG. 3 I have shown such a modification. A wave spring 55 is disposed within the unit, bearing against the annulus 12 and against the inwardly projecting flanges on the reinforcing ring of the inner member. A similar wave spring 56 is placed within the unit 11. Through this arrangement the desired pressure can be maintained on the seal ring over a wider range of axial movement of the machine parts.

From the foregoing, it will be understood that the device of the present invention is a self-contained sealing device having an inner seal adapted to handle only lubricants and having an outer seal guarding the inner seal from deterioration occasioned by extraneous materials which are abrasive. The sealing device is of simple construction and consequently can be manufactured at low cost without sacrificing quality, and when installed in a machine such as a track-laying tractor is capable of maintaining seal over a long period of time under the adverse condition encountered.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A self-contained face type sealing device comprising: a pair of units each consisting of an outer member and an inner member; interengaged means for preventing relative rotation between said inner and outer members, each said means permitting axial movement between the outer member and its associated inner member; a seal ring fixed upon each inner member; an elastomer annulus extending between each outer member and the associated inner member and bonded to said members; each outer member consisting of a metallic annulus with cylindrical flanges extending in the same direction from its edges, the annulus of one member being wider radially than the annulus of the other member; said units being fitted together with the seal rings engaging each other and with said outer flanges telescoped together and the elastomer annuli stretched to apply pressure to the seal rings; an elastomer O ring engaging the outer surface of the inner telescoped flange and the inner surface of the outer telescoped flange to form a seal therebetween; and a rim extending radially outwardly from the inner telescoped flange and a rim extending radially inwardly from the outer telescoped flange, said rims acting through said O ring to hold the units together as a unitary device.

2. A self-contained face type sealing device comprising a pair of units each consisting of an outer member and an inner member; interengaged means for preventing relative rotation between said inner and outer members, each said means permitting axial movement between the outer member and its associated inner member; a seal ring fixed upon each inner member; an elastomer annulus extending between each outer member and the associated inner member and bonded to said members; each inner member consisting of a metal ring having a cylindrical portion, an inwardly extending flange upon which the seal ring is fixed, an outwardly extending flange to which the inner edge of the elastomer annulus is bonded, and a reinforcing ring having a cylindrical portion fitted within and fixed to the cylindrical portion of said metal ring, which reinforcing ring also has inwardly extending lugs that form a portion of the means for preventing relative rotation between the inner and outer members; said units being fitted together with the seal rings engaging each other and with the outer members telescoped together and the elastomer annuli stretched to apply pressure to the seal rings; seal means interposed between the telescoped together portions of the outer members; and means on said telescoped together outer member portions acting through said seal means for holding the units together as a unitary device.

3. A self-contained face type sealing device comprising a pair of units each consisting of an outer member and an inner member; interengaged means for preventing relative rotation between said inner and outer members, each said means permitting axial movement between the outer member and its associated inner member; a seal ring fixed upon each inner member; an elastomer annulus extending between each outer member and the associated inner member and bonded to said members; a metal ring fixed in the outer member of each unit and having an inwardly extending flange to which the outer edge of the elastomer annulus is bonded; said units being fitted together with the seal rings engaging each other and with the outer members telescoped together and the elastomer annuli stretched to apply pressure to the seal rings; seal means interposed between the telescoped together portions of the outer members; and means on said telescoped together outer member portions acting through said seal means for holding the units together as a unitary device.

References Cited in the file of this patent

UNITED STATES PATENTS

| | | |
|---|---|---|
| 2,694,588 | Wooden | Nov. 16, 1954 |
| 2,701,154 | Dolhun | Feb. 1, 1955 |
| 2,776,851 | Heinrich | Jan. 8, 1957 |
| 2,871,040 | Payne | Jan. 22, 1959 |

FOREIGN PATENTS

| | | |
|---|---|---|
| 719,960 | Great Britain | Dec. 8, 1954 |